No. 892,305. PATENTED JUNE 30, 1908.
A. RAICHE.
SCREW DRIVING DEVICE.
APPLICATION FILED OCT. 8, 1906.
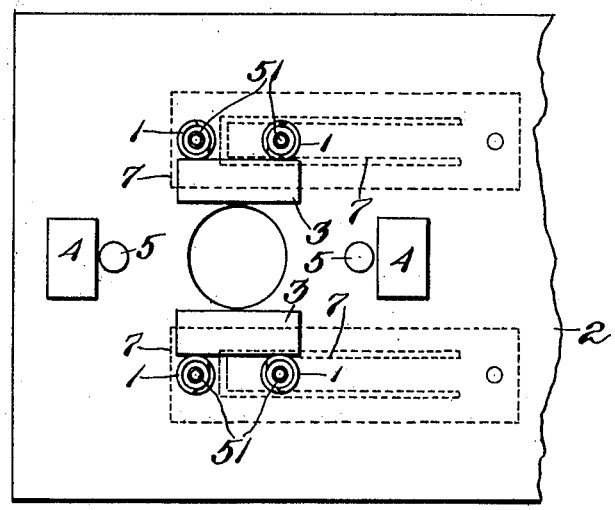
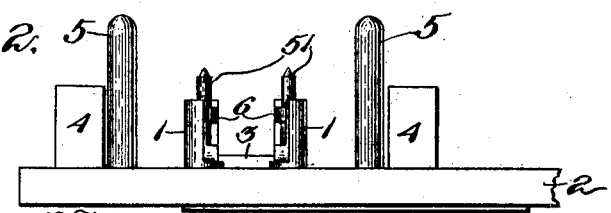
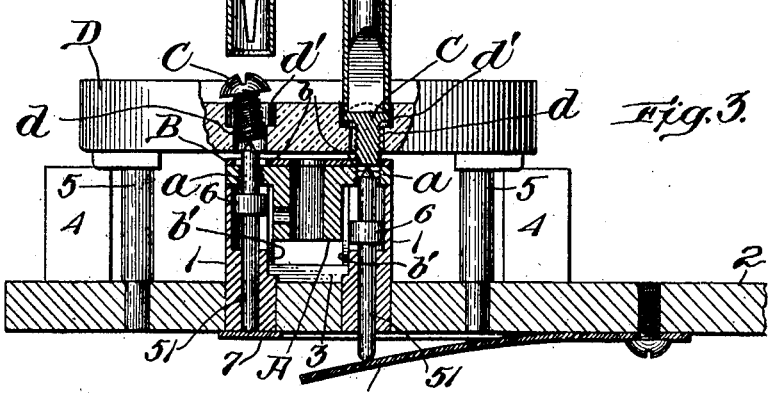
Witnesses:
Katharine A. Dugan
Geo. N. Goddard
Inventor:
Andrew Raiche
by Ira L. Fish
Attorney.

UNITED STATES PATENT OFFICE.

ANDREW RAICHE, OF QUINCY, MASSACHUSETTS, ASSIGNOR TO MARSHALL ELECTRIC MANUFACTURING COMPANY, OF BOSTON, MASSACHUSETTS, A CORPORATION OF MASSACHUSETTS.

SCREW-DRIVING DEVICE.

No. 892,305.  Specification of Letters Patent.  Patented June 30, 1908.

Application filed October 8, 1906. Serial No. 337,917.

*To all whom it may concern:*

Be it known that I, ANDREW RAICHE, citizen of the United States, and resident of Quincy, Massachusetts, county of Norfolk, have invented certain new and useful Improvements in Screw - Driving Devices, of which the following is a specification.

The invention relates to means for insuring the entrance of a machine screw into the screw-threaded hole into which it is to be driven and is especially designed for use in connection with machines or devices which are employed in connection with the driving of machine screws.

In the manufacture of electrical switches, lamp sockets, cut-outs and other articles, the metallic parts are usually secured to the porcelain or insulating bases or supports by machine screws and many of the metallic parts are also provided with binding or other screws which are screwed into them. The present invention may be used with special advantage in machines or appliances such as are used for introducing either the connecting or binding screws into the parts of such articles.

In practicing the invention the screw to be driven is directed or led into the hole into which it is to be driven by a pin which is yieldingly supported and is arranged to extend through the screw-threaded hole. The pin is in such position that the end of the screw bears upon the end of the pin as the screw is rotated and as the screw is forced toward the work the pin yields leading the end of the screw accurately into the screw-threaded hole. The pin continues to yield to accommodate the advance movement of the screw as the screw is driven home. The end of the pin which is engaged by the end of the screw may be and preferably is rounded or pointed so that it provides a restricted bearing portion at or approximately at the axis of the hole into which the screw is to be driven. With the end of the pin thus shaped it acts against the end of the screw as the screw is rotated to center the screw and bring its axis into substantial alinement with the axis of the hole into which it is to be driven and thus acts as a centering device as well as a device for leading or directing the screw into the hole into which it is to be driven. While it is not essential that the pin be thus provided with a bearing portion substantially at the axis of the hole into which the screw is to be driven the use of this form of pin results in additional advantages and this feature forms one of the features of the present invention.

The invention may be embodied in various constructions and its form and arrangement may be varied to suit the conditions under which it is to be used.

For the purpose of illustration I have shown the various features of the invention embodied in a device especially adapted for use in securing the binding posts and contacts of a snap switch to the porcelain base of the switch. This device is shown in the accompanying drawings, in which Figure 1 is a plan view. Fig. 2 is a side elevation; and Fig. 3 a sectional elevation showing the parts to be assembled in position for the introduction of the screws.

In the device shown in the drawings the binding post A is provided with two screw-threaded holes $a$ for the reception of the screws C which secure the binding post A and contact piece B to the porcelain base D. The contact piece B is provided with two holes $b$ through which the screws C pass and the porcelain base D is provided with holes $d$ for the reception of the screws, which holes are countersunk at $d'$ for the heads of the screws.

The binding post A is supported upon the upper ends of two posts 1 which are secured in the base plate 2. The base part of the contact plate rests upon the upper surface of the base of the binding post A as indicated in Fig. 3 and the spring arms $b'$ of the contact plate rest upon a support 3 secured upon the base plate 2. The porcelain base D is supported upon two supporting blocks 4 and is maintained in position with the screw holes $d$ in line with the screw holes $b$ and $a$ in the contact plate and binding post respectively by pins 5 arranged to enter holes in the base. The binding post and contact plate may be maintained in proper position upon the posts 1 by any suitable means.

The devices for leading the screws C accurately into the holes $a$ in the base of the binding post consist of pins 51 mounted within the posts 1 and arranged to project up through the holes $a$ in the binding post base. These pins are provided with enlarged collars 6 which fit within cylindrical recesses formed in the posts. These collars serve to strengthen and stiffen the pins and also assist in accurately guiding the pins and maintaining them in proper alinement. The pins are supported upon leaf springs 7 secured to the under surface of the base plate 2. The upper ends of the pins may be flat or of any suitable shape but it is preferred to provide the pins with more or less pointed ends so that the end of the pin will present a comparatively small bearing surface located at or about the axis of the hole through which the pin projects.

The screws C which are to be driven into the screw-threaded holes $a$ are introduced into the holes in the porcelain base either by hand or by suitable mechanism. The position of the screws when thus introduced may and usually will vary materially from the position which the screw should have in order that its lower end may accurately enter the hole into which it is to be driven. When the screw driver, which may be carried in a manually operated device or may be a part of an organized machine, engages the head of a screw and causes the screw to rotate, the lower end of the screw will engage the upper end of the pin 51 and the screw will assume an upright position. As the screw is now forced downward by the screw driving device or devices the pin 51 will yield and as the pin yields the end of the screw will follow the pin and be accurately led or directed into the hole $a$. In case the pin is provided with a restricted bearing surface in the axis of the hole $a$, the rotation of the screw when held in engagement with the end of the pin by the screw driver will cause the screw to center itself upon the end of the pin so that the accurate engagement of the end of the screw with the hole into which it is to be driven will be insured.

When using the invention under conditions similar to that shown in the drawings, it will probably be found advantageous to make the pins of a size to substantially fit the screw-threaded holes through which they extend and to utilize the pins to assist in maintaining the parts in proper relative position. In such case the pin not only furnishes a yielding support for the advance end of the screw but also acts as a yielding positioning pin projecting through the hole in the work into which the screw is to be driven.

It will be understood that the device illustrated in the drawing is only one of a large number of devices in which the features of the present invention may be embodied and that the details of construction and arrangement may be varied to suit the construction and arrangement of the particular device or apparatus in connection with which the invention is to be used.

Without attempting to point out the various forms and constructions in which the features of invention may be embodied, what I claim and desire to secure by Letters Patent is:—

1. In an apparatus for driving screws a yieldingly mounted pin arranged to extend through the hole into which a screw is to be driven.

2. In an apparatus for driving screws, devices for supporting the piece into which the screw is to be driven and a yieldingly mounted pin arranged to extend through the hole into which the screw is to be driven.

3. In an apparatus for driving screws, devices for supporting two or more parts with the screw holes in alinement, and a yieldingly mounted pin extending through the screw threaded hole in one part.

4. In an apparatus for driving screws, a yieldingly mounted pin arranged to extend through the hole into which a screw is to be driven, and provided with a restricted bearing surface in the axis of said hole.

5. In an apparatus for driving screws, a yieldingly mounted pin arranged to extend through the hole into which a screw is to be driven and provided with a pointed end.

6. In an apparatus for driving screws, a support for the work and a yielding screw support for supporting the end of a screw and leading it into a hole in the work.

7. In an apparatus for driving screws a support for the work and a yieldingly supported pin adapted to fit a screw threaded hole in the work.

8. In an apparatus for driving screws, a device for engaging the end of the screw and leading it into the hole into which it is to be driven.

In witness whereof, I have hereunto set my hand, this 26th day of September 1906.

ANDREW RAICHE.

In the presence of—
  IRA L. FISH,
  KATHARINE A. DUGAN.